United States Patent [19]

Hewel et al.

[11] Patent Number: 5,723,567
[45] Date of Patent: Mar. 3, 1998

[54] COPOLYAMIDES

[75] Inventors: Manfred Hewel, Rodels; Ulrich Presenz, Trins, both of Switzerland

[73] Assignee: EMS-INVENTA AG, Zürich, Switzerland

[21] Appl. No.: 536,495

[22] Filed: Sep. 28, 1995

[30] Foreign Application Priority Data

Sep. 29, 1994 [DE] Germany .................. 44 34 899.1

[51] Int. Cl.$^6$ ........................ C08G 69/26; C08G 69/32
[52] U.S. Cl. .............. 528/310; 528/322; 528/326.1; 528/335; 528/339; 528/340; 428/458; 428/473.5
[58] Field of Search ................... 528/339, 335, 528/340, 310, 322, 326.1; 428/458, 473.5

[56] References Cited

U.S. PATENT DOCUMENTS

| | | | |
|---|---|---|---|
| 4,018,746 | 4/1977 | Brinkmann et al. | 528/335 |
| 4,278,779 | 7/1981 | Nakagawa et al. | 525/432 |
| 4,826,955 | 5/1989 | Akkapeddi et al. | 528/324 |
| 5,028,462 | 7/1991 | Mattack et al. | 428/35.7 |
| 5,612,446 | 3/1997 | Presenz et al. | 528/310 |

FOREIGN PATENT DOCUMENTS

| | | |
|---|---|---|
| 0 288 972 | 11/1988 | European Pat. Off. . |
| 0 355 017 | 2/1990 | European Pat. Off. . |
| 0 411 791 | 2/1991 | European Pat. Off. . |
| 1 812 018 | 12/1970 | Germany . |
| 40 17 046 | 11/1991 | Germany . |
| 43 09 534 | 8/1994 | Germany . |
| 1 575 801 | 10/1980 | United Kingdom . |
| 93 21276 | 10/1993 | WIPO . |

OTHER PUBLICATIONS

DATABASE WPI, Section Ch, Week 7839, Derwent Publications Ltd., London, GB; Class A23, AN 78–69568A, XP002008604, & JP-A-53 096 064 (Toyobo KK), 22 Aug. 1978.

Abstract of Japanese Publication No. 05/295313 published on 09Nov.1993.

Abstract of Japanese Publication No. 05/064866 published on 19Mar.1993.

Abstract of Japanese Publication No. 02/089643 published on 29Mar.1990.

Abstract of Japanese Publication No. 01/319531 published on 25Dec.1989.

Abstract of Japanese Publication No. 52/135352 published on 08May1976.

Abstract of Japanese Publication No. 52/135353 published on 08May1976.

Computer-Output, 3 pages, of material cited by Examiner in German Official Action of priority application (Including translation of part of the Official Action).

*Primary Examiner*—P. Hampton-Hightower
*Attorney, Agent, or Firm*—Browdy and Neimark

[57] ABSTRACT

A partially aromatic copolyamide is formed of:
(a) 5 to 30 weight-% of hexamethylene diamine
(b) 10 to 40 weight-% of metaxylylene diamine
(c) 15 to 50 weight-% of adipic acid
(d) 5 to 45 weight-% of at least one aliphatic dicarboxylic add with 7 to 10 carbon atoms, preferably sebacic acid and/or acelaic acid, wherein the components (a) to (d) add up to 100 weight-%, and the add groups and the amine groups are essentially present in equimolar portions. These novel copolyamides are used for producing barrier layers for mono- or multi-layered composites, such as foils or containers, infusion- or ostomy bags, shrink wraps for meat, fish and cheese packagings or sausage skins, wherein the copolyamides can be present in the pure form or as a mixture with other polymers, in particular in combination with further polymer layers.

8 Claims, No Drawings

COPOLYAMIDES

FIELD OF THE INVENTION

The invention relates to a partially aromatic copolyamide on the basis of metaxylylene diamine and hexamethylene diamine as the amine components and adipic acid and at least one further dicarboxylic acid selected from the group of aliphatic dicarboxylic acids with 7 to 10 carbon atoms as well as optional further additives.

BACKGROUND OF THE INVENTION

Materials made of partially aromatic, as a rule partially crystalline, copolyamides show a special combination of mechanical properties (toughness and flexibility, among others), thermal properties (such as melting point and ability to be sterilized, among others) and barrier effects.

An increasing requirement for suitable plastic materials to replace glass and metal containers has existed for a long time in the packaging and food industry as well as in the pharmaceutical industry. This applies in particular to the packaging of foodstuffs, beverages and pharmaceutical products. As a rule the multilayered packaging systems employed in these areas comprise several layers of different polymers, such as polyethylene, polypropylene, polyvinyl-chloride and -fluoride, polyvinyl alcohol, polyacrylate and other polymers, their blends and their mixtures. The above mentioned packaging systems are intended to protect foodstuffs, beverages and medical, chemical, biological and pharmaceutical products. In the widest sense these packaging systems include hoses, tubes, bottles, containers, packaging foils and the like.

However, it is a requirement for the above mentioned areas of applications that the plastic materials used have barrier layer effects in respect to gases such as oxygen, carbon dioxide, water vapor and other gases, in addition to good working properties and good mechanical properties. It is also intended that these materials provide a barrier against flavors and fragrances or toxic and/or non-toxic gases.

Many lactam-containing copolyamides have been described so far in the patent literature, which have the disadvantage that monomers migrate out of the copolyamide layer, which is impermissible and dubious for toxicological reasons in connection with packaging in the area of foodstuffs.

Copolyamides with metaxylylene diamine (MXDA) as components have quite often been described, among other in EP-A-411 791, EP-A-288 972, GB-A-1,575,801, JP-A-01 319531, JP-A-02 089643, JP 05 064866, JP 52-135352 with aromatic dicarboxylic acids, mainly isophthalic acid and terephthalic acid as the comonomers. Based on the required high condensation temperatures and the resulting high melt viscosities, copolyamides of this type are difficult to produce. The resulting materials have very high stiffness and brittleness.

Copolyamides with MXDA and caprolactam, such as have been described in DE-AS-18 12 018, JP 52-135353, U.S. Pat. No. 4,826,955 and WO 93/21276, must be extracted for use in the packaging field to reduce the migration of the lactam remainder. The additional extraction step lowers the profitability of the material. Nevertheless, the materials obtained do not satisfy all requirements, for example in the medical sector.

Copolyamides made of MXDA and dimeric fatty acids have been described in EP-A-355 017 and JP-A-05 295313. Because of the long carbon chains of the fatty acid components, copolyamides of this composition show insufficient barrier properties against gases.

OBJECTS AND SUMMARY OF THE INVENTION

It is therefore an object of the invention to provide copolyamides containing metaxylylene diamine (MXDA) as a monomer component for use as barrier layer in multilayered packaging materials, which overcome the disadvantages of the prior art mentioned, in particular the disadvantages of high melt viscosity, great stiffness, great brittleness, and to avoid the necessity of high condensation temperatures and an additional extraction step. In this case the combination of desired mechanical properties, thermal properties and barrier effect particularly desired to be achieved according to the present invention.

Copolyamide compositions of metaxylylene diamine (MXDA) and at least three further monomers and their use as a barrier layer in multilayered composites are a particular object of the invention. These in particular are copolyamides of MXDA and hexamethylene diamine (HMDA) as the amino component together with adipic acid and at least one further dicarboxylic add selected from the group of the aliphatic dicarboxylic acids with 7 to 10 carbon atoms, the resultant copolyamides being materials which do not have the disadvantages mentioned above.

DETAILED DESCRIPTION OF EMBODIMENTS

A combination of the following components is desirably provided in accordance with the invention:

(a) 5 to 30 weight-% of HMDA (b) 10 to 40 weight-% of MXDA (c) 15 to 50 weight-% of adipic acid (d) 5 to 45 weight-% of at least one further aliphatic dicarboxylic acid having 7 to 10 atoms.

The monomer portions (a) to (d) add up to 100 weight-%, wherein the amine and acid components are present in approximately equi-molar portions.

It is known to one skilled in the art that, for generating defined polymerization degrees or end groups or for reasons of production technology, in the course of polyamide production the amine or the acid components are employed in a slight excess, as a rule not more than 5 mol-% excess.

A particularly preferred composition in accordance with the invention comprises (a) 8 to 27 weight-% of HMDA (b) 13 to 39 weight-% of MXDA (c) 19 to 47 weight-% of adipic acid (d) 7 to 41 weight-% of sebacic acid or azelaic acid or their mixture, wherein the monomer portions (a) to (d) add up to 100 weight-%.

The partially aromatic copolyamides in accordance with the invention can optionally contain the usual additives in accordance with the prior art, such as chain regulators (preferably amines or diamines), stabilizers, anti-foaming agents, crystallization accelerators, and the like.

The production of the partially aromatic copolyamides in accordance with the present invention is performed in a known manner in accordance with the melt condensation process.

Depending on the application, the preferred range of the relative viscosity of the copolyamide in accordance with the invention (measured as a 0.5% solution in m-cresol at 20° C.) lies between 1.6 and 2.5. However, higher as well as lower viscosities can also be produced without problems.

Areas of use of the partially aromatic copolyamides in accordance with the present invention are found in multilayered composites for, among others, the medical area, for example as the only or an additional barrier layer in infusion and ostomy bags or in shrink wraps for meat, fish and cheese packaging or sausage skins.

Several, if required different, barrier layers and several further polymer layers can be used for the multilayered composites. Preferred further polymer layers are protective and support layers which lend the multilayered composite defined application properties. Sealing layers are required to be used in those cases where it is desired to make the multilayered composite sealable by hot sealing. Coupling agent layers can also be used advantageously.

Preferred polymers for the protective and support layers are those consisting of polyamides, polyolefins or polyesters. Preferred coupling agent layers are functionalized polyolefins, i.e. polyolefins provided with functional groups. Sealing layers advantageously consist of low-melting polymers. So-called inomers, besides polyolefins, are preferred as sealing layers.

The production of the multilayered composite is advantageously performed in coextrusion installations, but can also be performed by means of laminating.

The use of the present copolyamides as a compatible blend component for mixtures with ethylene-vinyl alcohols should be mentioned as a special use, which serves to improve the deep-drawing properties and the flexibility of the ethylene-vinyl alcohol polymers and which involves a relatively small loss in the barrier effect. Blends of this type can be used for producing containers. The present copolyamides can also be blended with other compatible thermoplastics including polyvinyl alcohol, polyacrylates, polyolefins, polyesters, copolyesters, polyamides, copolyamides, polycarbonate and their blends or mixtures.

A further option is provided by the use of the copolyamides in accordance with the invention for producing mono- and multi-layered sausage skins. For this purpose the partially aromatic copolyamide in accordance with the invention can be used in pure form or in a mixture with other polymers, for example other polyamides, preferably polyamide 6.

The copolyamides in accordance with the invention can be employed in the non-oriented or the uniaxially or biaxially oriented state for all areas of application.

Sterilization of the copolyamides in accordance with the invention is also possible, in part without loss of the mechanical properties and with only very slight loss of transparency.

The invention will be further explained by means of the following example.

An autoclave which is well agitable is charged with monomers corresponding to the composition of Table 1. A pressure of 18 to 20 bar is built up in the pressure phase at a temperature of approximately 270° C. This pressure is let off in the subsequent expansion phase. The final polycondensation takes place in the degassing step which follows. The temperature of the melt should not be permitted to exceed 275° C. The entire process lasts between 6 and 9 hours.

The product is delivered in the form of a strand by means of a melt pump, and the extrudate cooled in a water bath, granulated and subsequently dried.

TABLE 1

| | Composition by Weight-% | | | |
|---|---|---|---|---|
| | HMDA | MXDA | Adipic Acid | Sebacic Acid |
| Example | 24,28 | 18,97 | 35,63 | 21,12 |

The properties of this partially aromatic copolyamide in accordance with the invention as well as the properties of the copolyamide foils produced in a foil extruder are shown in Tables 2 and 3.

TABLE 2

| Properties | | |
|---|---|---|
| Melt Viscosity (275° C./5 kg) | [Pa s] | 100–600 |
| Impact, notched Charpy, 23° C. ** | [kJ/m$^2$] | * n.b. |
| Tensile E-Modulus ** | [N/mm$^2$] | 500 |
| TG DSC (Inflection Point) | [°C.] | 57 |
| Melting Point | [°C.] | 176–178 |

\* Test rods without breaking (in accordance with DIN 53453): n.b. = no break
\*\* Measured on conditioned test bars The oxygen and carbon dioxide permeations represented in Table 3 were measured with a gas permeability testing device in accordance with the DIN 53380 (ISO 2556) standard.

Furthermore, the tensile strength of the blown films in accordance with the invention (50 mm) was measured in accordance with ISO 1184 traverse to the direction of the machine. In the process, values between 60 to 80 N/mm$^2$ were measured for the copolyamide foils in accordance with the invention.

TABLE 3

| Properties | | |
|---|---|---|
| Blown Film of 50 μm Thickness Permeation | | [cm$^3$/m$^2$ d bar] |
| Oxygen | 0% rh | 50 |
| | 85% rh | 25 |
| Carbon Dioxide | 0% rh | 140 |
| | 85% rh | 190 |

Permeation: Measuring Devices
0% rh Lissy L 100
85% rh Mocon Oxtran Twin
rh = relative humidity The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A partially aromatic copolyamide on the basis of metaxylylene diamine and hexamethylene diamine as the amine components and adipic acid and at least one further dicarboxylic acid selected from the group consisting of aliphatic dicarboxylic acids with 7 to 10 carbon atoms wherein the copolyamide consists essentially of the following components:
- (a) 5 to 30 weight-% of said hexamethylene diamine,
- (b) 10 to 40 weight-% of said metaxylylene diamine,
- (c) 15 to 50 weight-% of said adipic acid, and
- (d) 5 to 45 weight-% of said at least one aliphatic dicarboxylic acid with 7 to 10 carbon atoms, wherein the components (a) to (d) add up to 100 weight-%, and the acid groups and the amine groups are present in approximately equimolar portions.

2. A copolyamide in accordance with claim 1, comprising:
- (a) 8 to 27 weight-% of said hexamethylene diamine
- (b) 13 to 39 weight-% of said metaxylylene diamine
- (c) 19 to 47 weight-% of said adipic acid, and
- (d) 7 to 41 weight-% of said at least one aliphatic dicarboxylic acid with 7 to 10 carbon atoms.

3. A copolyamide in accordance with claim 1 wherein said at least one aliphatic dicarboxylic acid having 7–10 carbons is sebacic acid, azelaic acid or a mixture thereof.

4. A copolyamide in accordance with claim 3 consisting essentially of approximately 24 weight-% of said hexamethylene diamine, approximately 19 weight-% of said metaxylylene diamine, approximately 35 weight-% of said adipic acid and approximately 21 weight-% of sebacic acid.

5. A copolyamide in accordance with claim 1 having a relative viscosity (measured as a 0.5% solution in m-cresol at 20° C.) of between 1.6 and 2.5.

6. A partially aromatic copolyamide in accordance with claim 1 wherein neither the amine nor the acid components are present in more than 5 mole-% excess.

7. A partially aromatic copolyamide in accordance with claim 1 further comprising at least one additive selected from the group consisting of a chain regulator, a stabilizer, an anti-foaming agent, and a crystallization accelerator.

8. A partially aromatic copolyamide in accordance with claim 1 in film form.

* * * * *